March 8, 1960 W. HERRMANN 2,927,667
SPEED CONTROL ARRANGEMENT FOR MOTOR VEHICLES
Filed Jan. 6, 1958 2 Sheets-Sheet 1
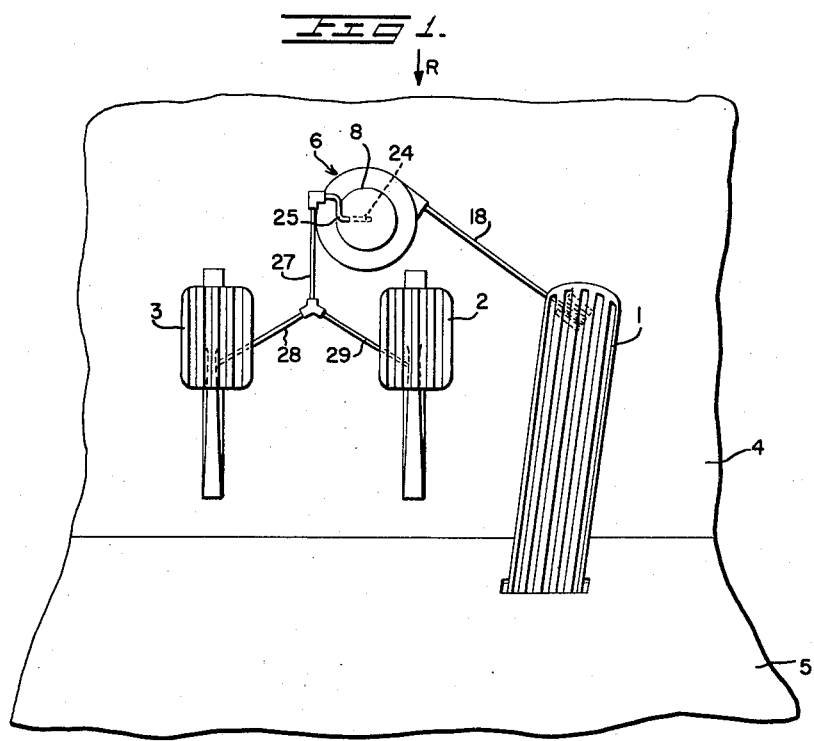
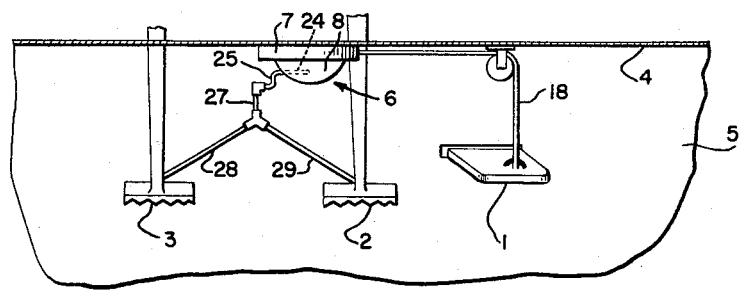
INVENTOR
WILLY HERRMANN
BY *Dike and Bray*
ATTORNEYS March 8, 1960 W. HERRMANN 2,927,667
SPEED CONTROL ARRANGEMENT FOR MOTOR VEHICLES
Filed Jan. 6, 1958 2 Sheets-Sheet 2
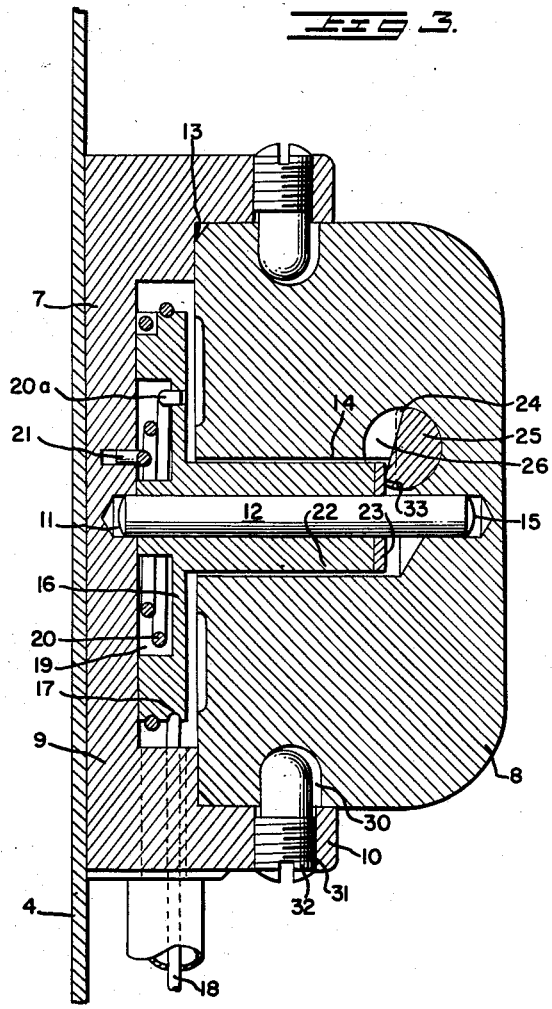
INVENTOR
WILLY HERRMANN
BY
ATTORNEYS

United States Patent Office 2,927,667
Patented Mar. 8, 1960

2,927,667

SPEED CONTROL ARRANGEMENT FOR MOTOR VEHICLES

Willy Herrmann, Ludwigsburg, Germany

Application January 6, 1958, Serial No. 707,421

Claims priority, application Germany January 7, 1957

16 Claims. (Cl. 192—.094)

The present invention relates to an arrangement for maintaining a predetermined speed of the motor vehicle by securing the gas pedal in a predetermined position thereof.

In the known arrangements of manually adjustable speed control devices, it is necessary to manually bring the adjusting device into the operative position thereof by means of a lever, push button or the like for fixing the speed and to manually disengage the same again for purposes of release.

In other types of prior art devices, it was suggested to control the disengaging or releasing device by the brake or clutch pedal or by both, however, as with the other prior art devices, the clamping device had to be first brought into the operative position thereof. In order to enable such a control, the gas pedal has to be connected with a crank drive, detents and locking disks. However, such a construction is expensive, requires a relatively large space, and cannot be installed subsequently into motor vehicles since there is rarely sufficient space left therefor and since several parts have to be exchanged. Nonetheless, even with these types of prior art devices, the actuation and control remain complicated since, after disengagement of the clamping device, the clamping device has to be rendered effective anew every time by means of a lever or the like.

According to the present invention, all of the aforementioned disadvantages and difficulties are overcome in that a tensioning arrangement is provided which is tensioned by the brake or clutch pedal and thereby retains the gas pedal in the preselected operating position thereof while the release of the tensioning arrangement and therewith also the return of the gas pedal to the idling position thereof takes place by another actuation of the brake or clutch pedal unless the gas pedal is kept in the particular operating position by the continued application thereon of a force by means of the driver's foot.

Such an arrangement makes it unnecessary to render the installation only effective by actuation of separate, special means since the tensioning arrangement may be readily tensioned or released itself by briefly stepping on the brake or clutch pedal. The retention of the gas pedal in a predetermined position and therewith the tension in the tensioning arrangement is achieved by one or several springs, possibly by the return springs of the brake or clutch pedal. Especially if the return springs of the clutch and/or brake pedals are used for purposes of retention of the gas pedal, a very simple construction with very few parts results therefrom.

The connection of the tensioning device with the gas linkage or gas pedal takes place by means of a flexible draw or pull member, for example, by means of a rope, a string, chain, cord, cable or the like. The tension in the tensioning device itself is obtained by means of a spring which acts on the winding drum provided for the draw or pull member which leads to the gas linkage. The winding drum is thereby retained in the adjusted or selected position by friction.

The arrangement according to the present invention becomes particularly appropriate if a locking lever of the tensioning device is under the effect and influence of the return springs for the clutch and gas linkage. Furthermore, the locking lever of the tensioning device is connected with the clutch and/or brake linkage by draw or pull means, for example, ropes, chains, cables or the like. One draw or pull member each may be secured to the brake and clutch pedals which then combine into a single draw or pull member and which leads to the locking lever. The arrangement according to the present invention becomes particularly effective if the extended axis of the draw or pull member secured to the locking lever divides the angle into approximately two equal halves which is subtended by the two other branch draw members connected with the brake and clutch pedals, respectively.

Furthermore, an arrangement which does not disturb the driver may be obtained if the tensioning device is secured in the passenger space at the lower part of the fire wall above the actuating pedals. The winding drum is provided with a recess in which the tensioning spring, preferably a torsion-compression spring, is accommodated and includes a sleeve-shaped hub portion. The tensioning device further includes an upper and a lower housing part in which the winding drum is rotatably supported by a centering bolt. The locking lever is supported in the upper housing part and keeps the winding drum in the position thereof by frictional engagement. The upper housing part of the tensioning device further includes a circumferential groove into which extend securing bolts arranged in the lower housing part.

The arrangement according to the present invention which is simple, inexpensive, and requires relatively little space, may be installed in series production during assembly of new cars as well as in used cars at any time without any change of parts thereof.

Accordingly, it is an object of the present invention to provide a speed control arrangement for maintaining constant the vehicle speed of a motor vehicle which is simple in construction, requires relatively little space, and yet is reliable in operation.

Another object of the present invention resides in the provision of a speed control arrangement for maintaining essentially constant the speed of a motor vehicle which may be installed with simple means into used cars or which may equally readily be installed into new cars during series or mass production thereof.

Still another object of the present invention resides in the provision of an arrangement for use with a motor vehicle which enables the driver to adjust the engine speed to a predetermined preselected speed and to maintain such speed with simple means while at the same time enabling a relatively simple control of this arrangement.

These and other objects, features and advantages of the present invention will become more obvious from the following description when taken in connection with the accompanying drawing which shows, for purposes of illustration only, one embodiment in accordance with the present invention and wherein:

Figure 1 is a plan view of the speed control arrangement in accordance with the present invention for maintaining a predetermined speed of the motor vehicle together with the adjacent vehicle parts ordinarily found in a motor vehicle;

Figure 2 is a top plan view in the direction of the arrow R of Figure 1; and

Figure 3 is an enlarged central axial cross-sectional view through the tensioning device in accordance with the present invention showing the tensioning device in the tensioned condition.

Referring now to the drawing wherein like reference numerals are used throughout the various views to designate like parts, and more particularly to Figures 1 and 2 thereof, reference numeral 1 designates therein an engine-throttle-adjusting means such as the gas pedal of conventional construction which is usually found in modern motor vehicles. The brake pedal is designated by reference numeral 2 and the clutch pedal by reference numeral 3, all of the pedals 1, 2 and 3 being shown located at the lower part of the fire wall 4 or the floor 5 of the motor vehicle. The gas pedal 1 as well as the brake pedal 2 and the clutch pedal 3 are each provided with a return spring, as is conventional, and which, for clarity's sake, have not been shown in the drawing, by means of which each of the pedals is returned to the normal rest position thereof and is normally retained therein. The gas pedal is biased by its return spring to an idling or low engine speed position and may be depressed against the spring bias by the driver through a range of higher speed positions. The brake and clutch pedals are biased by their respective springs to the non-braking and clutch-engaged positions in any conventional manner.

In the embodiment illustrated in Figures 1 and 2, a lockable tensioning device generally designated by reference numeral 6 is secured at the lower part of the fire wall 4 in the passenger space of the vehicle, and more particularly above and between the clutch pedal 3 and the brake pedal 2. The tensioning device 6 includes a lower housing part 7 and an upper housing part or cover 8 (Figures 1, 2 and 3). The lower housing part 7 (Figure 3) includes a circularly shaped disk portion 9 which passes over into an annularly shaped extension 10. The disk portion 9 is provided with a central bore or tapping 11 for purposes of journalling therein a centering bolt 12. The upper housing part 8 which may be made of any suitable material, for example, also of synthetic material rests on an annular shoulder 13 provided in the ring 10 and includes a central bore 14 which does not extend clear therethrough and a tapped bore 15 to accommodate therein the centering bolt 12. A cable-tensioning means is enclosed by the housing and includes a spring-biased winding drum 16 which is rotatably supported on the centering bolt 12 in the space between the upper and lower housing parts 7 and 8, the upper bearing for the centering bolt 12 being formed by the tapped bore 15. The winding drum 16 is provided with circumferential grooves 17, for example, of helical configuration, for a pull or draw member 18 secured thereto and at least partially wound thereon, for example, a pull rope or cable 18 which is also secured at the other end thereof at the gas pedal 1 or linkage connected therewith. A torsion-compression spring 20 is accommodated within recess 19 provided in the winding drum 16 and, on the one hand, is secured or clamped at 20a in the winding drum 16, and, on the other, at 21 in the lower housing part 7. The winding drum 16 has a hub portion 22 which is guided by the centering bolt 12 and which extends into the bore 14. An annular steel ring 23 is disposed at the upper end of the hub portion 22.

A cross bore 24 is provided in the upper housing part 8 in which a releasable locking means for drum 16 such as a locking lever 25 is supported. The locking lever 25 is provided within the region of the hub portion 22 of the winding drum 16 with a recess 26 so that the bottom surface of the recess designated by reference numeral 33 is at a distance from the steel ring 23 when the locking lever 25 is in a position in which the bottom surface 33 is parallel to the surface of the steel ring 23, for example, corresponding to the position in which the crank arm of lever 25 is parallel to the surface of wall 4 on which the lower housing part 7 is supported. A draw or pull member, for example, a rope, cable or cord 27 is secured to a crank portion at the outer end of the locking lever 25 (Figures 1 and 2), two branch pull or draw members 28 and 29 being secured to the pull or draw member 27 at a distance from the locking lever 25 which form or subtend an angle therebetween. In the embodiment illustrated herein, the draw or pull cord 28 is secured at the clutch pedal 3 and the draw or pull cord 29 at the brake pedal 2. The arrangement is thereby preferably so made that the angle which is subtended by the cord 28 and by the cord 29 is subdivided approximately into two equal angles by the extended axis of the cord 27.

The upper housing part 8 includes a circumferential groove 30 while the lower housing part 7 is provided with several threaded bores 31, for example, at two to four places equidistant from each other in which are secured retainer bolts 32. As a result of such a construction, the upper housing part 8 may be rotatably adjusted to select a desired position of the locking lever 25.

Operation

By slightly stepping on the brake pedal 2 or on the clutch pedal 3 the cord 28, for example, is relieved. At the same time, however, the rope 29 has to be relieved without actuation of the brake pedal 2. For that reason, the locking lever 25 is so adjusted that upon actuation of one of the pedals 2 or 3, either of the clutch pedal 3 or the brake pedal 2, the cord or cable leading to the other pedal is also simultaneously relieved of any tension. In order to enable this adjustment, the circumferential groove 30 is provided with securing bolts 32 to permit relative rotation of housing portions 8 and 9 in the direction of tensioning.

In the tensioned position which corresponds to the normal or rest position of the clutch pedal 3 and of the brake pedal 2, which are retained in the outermost position thereof by the respective return springs (not shown), the locking lever 25 is maintained thereby in the inclined position shown in full lines in Figures 3 of the drawing. As a result thereof, the abutment or bottom surface 33 abuts against the steel ring 23, thereby pushes the winding drum 16 which has sufficient play with respect to the lower housing part downwardly against the lower housing part 7 and thereby retains the winding drum 16 in this position.

If, during the drive, the gas pedal 1 is pressed down in the known manner by the driver, then the throttle valve in the carburetor is actuated thereby over the usual linkage (not shown) and the engine receives a predetermined quantity of fuel. At the same time, the cord or cable 18, which leads from the gas pedal 1 to the tensioning device 6 is correspondingly relieved and becomes lax. The vehicle drives with a predetermined speed. If this speed is to be maintained, then according to the present invention the clutch or the brake pedals 3 or 2 are slightly stepped on very briefly by the foot of the driver while the gas pedal 1 is held in the desired position. The path which either of these two pedals 3 or 2 has to traverse is very small so that neither unclutching nor braking takes place. By stepping on the pedals 3 or 2, the ropes 27—29 become loose for a short time, so that the locking lever 25 is rotated, thereby releasing the winding drum 16 whereupon the latter rotates under the effect of the spring 20 for such length of time until the cable 18 leading to the gas pedal is again under tension, i.e., by an amount by which the gas pedal 1 has been depressed whereby the cable 18 is wound on the drum 16 in the circumferential grooves 17 thereof. The gas pedal 1 now remains in the adjusted position and the driver's foot may be removed therefrom since the surface 33 of the locking lever 25 has already returned the winding drum 16 back into the frictional engagement with the housing 7. This takes place in the illustrated embodiment by the return springs of the clutch or brake pedals 3 and 2 (not shown) which return there pedals to the outermost positions thereof and thereby re-tension the rope or cable 27—29. The release takes place in the same manner. If the clutch or brake pedal 3 or 2 are again actuated for a short period of time, then the locking lever 25 is again released, whereby the winding drum 16 is also released. The return spring of the gas pedal 1 which is chosen stronger than the torsion-compression spring 20 rotates the winding drum 16 in opposition to the effect of the spring 20, thereby releasing the cable 18 and permitting the gas pedal 1 to return to the idling position thereof.

The present invention is not limited to the embodiment described herein; for example, it is quite possible that the tensioning device may be located behind the fire wall 4, i.e., in the engine compartment and is not visible from the passenger space while the draw or pull members, such as strings, chains, cables, ropes or cords, for example, made of synthetic or plastic material may lead to the tensioning device 6 through appropriate apertures provided in the fire wall 4. If a manual operation is also desired, for example, for invalids, this may be readily obtained in that the locking lever 25 may be additionally connected with a pull device leading to the switchboard or steering wheel.

Furthermore, it is quite obvious that the rope or cable 18 need not be connected directly with the gas pedal 1 but may be connected with any part of the linkage leading to the carburetor for actuation of the throttle valve or to the rack adjusting the injection pump in case of a fuel injection system. Similarly, the pull cords or cables 28 and 29 may be connected with any part of the clutch or brake linkage as desired. Thus, it is quite obvious that the present invention is susceptible of many changes and modifications within the spirit and scope of the present invention, and I intend to cover all such changes and modifications as encompassed by the appended claims.

I claim:

1. In an engine-driven motor vehicle having an engine-throttle-adjusting means spring-biased to a low speed position and having a range of higher speed positions, and spring-biased foot pedal means for controlling operation of the vehicle, each of said means being engageable and actuatable by a driver of the vehicle, an arrangement for maintaining constant the speed of said vehicle by holding the engine-throttle-adjusting means in a selected higher speed position, comprising a lockable device mounted on said vehicle independently of said engine-throttle-adjusting means, said lockable device including tensioning means, a flexible pulling element connected in tension between said tensioning means and said engine-throttle-adjusting means, the spring-bias of said throttle-adjustment means being greater than the force of said tensioning means, said lockable device including releasable locking means for locking said tensioning means to fix the position of said flexible pulling element, and means interconnecting said releaseable locking means and said foot pedal means to lock said locking means by the application thereto of a biasing force of said foot pedal means; said lockable device, said flexible pulling element and said interconnecting means being so constructed and arranged that on application of said biasing force to said locking means, by release of the foot pedal means by the vehicle driver, said engine-throttle-adjusting means may be locked in a higher speed position by said lockable device, said higher speed position being selected by adjustment of the engine-throttle-adjusting means against its spring-bias prior to release of the foot pedal means, said locking means being releaseable to release said tensioning device and therewith said engine-throttle-adjusting means from said higher speed position to said low speed position upon further actuation of said foot pedal means.

2. Apparatus according to claim 1, wherein said releaseable locking means comprises a crank means projecting from said lockable device, said tensioning means including a spring-biased drum for winding said pulling element, said lockable device including cooperating force-locking friction surfaces located in part on said drum, said crank means and said tensioning means including cooperating mutually engageable surfaces for applying a locking force from said crank means to said tensioning means to hold said friction surfaces in engagement for locking the position of said drum, the surface of said tensioning means engaged by said crank means having an annular configuration.

3. Apparatus according to claim 1, wherein said lockable device includes a housing and wherein said tensioning means includes a spring-loaded winding drum, said drum and said housing having mutually engageable friction surfaces, said releaseable locking means including means for holding said frictional surfaces in force-locking arrangement to lock the position of said drum relative to said housing, the interconnecting means between said releaseable locking means and said foot pedal means comprising a flexible pulling element.

4. Apparatus according to claim 1, wherein said lockable device includes a housing and said tensioning means includes a spring-loaded winding drum for winding thereon the pulling element connected to said engine-throttle-adjusting means, said winding drum being provided with a recess and a hub-shaped portion, and a torsion-compression spring being accommodated in said recess for biasing said drum in the direction to wind said pulling element thereon.

5. Apparatus according to claim 4, wherein said housing is formed of upper and lower housing parts and further including a centering bolt for supporting said winding drum in said upper and lower housing parts.

6. Apparatus according to claim 5, wherein said releaseable locking means comprises a locking lever supported in said upper housing part for retaining said winding drum in frictional engagement with said housing.

7. Apparatus according to claim 6, wherein said upper housing part is provided with means for rotatably adjusting and securing it relative to the lower housing part.

8. Apparatus according to claim 1, wherein the means interconnecting the releaseable locking means and the foot pedal means includes a flexible pulling element.

9. Apparatus according to claim 1, wherein said engine-throttle-adjusting means is a foot pedal.

10. Apparatus according to claim 1, wherein said foot pedal means is a pedal for actuating a brake system of the vehicle.

11. Apparatus according to claim 1, wherein said foot pedal means is a clutch pedal.

12. Apparatus according to claim 1 wherein said foot pedal means comprises both a brake pedal and a clutch pedal, each of which is connected by said interconnecting means to lock said releaseable locking means when both said foot pedals are released, each of said brake and clutch pedals being connected by said interconnecting means so as to be individually actuatable to lock and release said locking means.

13. Apparatus according to claim 12, wherein said interconnecting means includes two branch cables connected, respectively, each by one end thereof, to said brake and clutch pedals, said cables being connected together at their other ends, and further including a single cable connecting said last mentioned ends to said releaseable locking means.

14. Apparatus according to claim 13, wherein the extended axis of said single cable at its junction with said two branch cables essentially equally divides the angle subtended by said branch cables.

15. In an engine-driven motor vehicle having a first foot pedal means for controlling engine speed and being spring-biased to a low speed position and having a range of higher speed positions, and second spring-biased foot pedal means for controlling operation of a brake system of the vehicle, each of said pedal means being engageable and actuatable by a driver of the vehicle, an arrangement for maintaining constant the speed of said vehicle by holding said first pedal means in a selected higher speed position, comprising a lockable device mounted on said vehicle independently of said first pedal means, said lockable device including tensioning means, a flexible pulling element connecting in tension between said tensioning means and said first pedal means, the spring-bias of said first pedal means being greater than the force of said tensioning means, said lockable device including releaseable locking means for locking said tensioning means to fix the position of said flexible pulling element, and means including a flexible pulling element interconnecting said releaseable locking means and said foot pedal means to lock said locking means by the application thereto of a biasing force of said foot pedal means; said lockable device, said flexible pulling element and said interconnecting means being so constructed and arranged that only on application of said biasing force to said locking means, by release of the second foot pedal means by the driver, said first foot pedal means may be locked in a higher speed position by said lockable device, said higher speed position being selected by adjustment of the first pedal means against its spring-bias prior to release of the second foot pedal means, said locking means being releaseable to release said tensioning device and therewith said first pedal means from said higher speed position to said low speed position only upon further actuation of said second foot pedal means.

16. In an engine-driven motor vehicle having a gas pedal for controlling engine speed and being spring-biased to a low speed position and having a range of higher speed positions and a brake pedal for controlling operation of a brake system of the vehicle, each of said pedals being engageable and actuatable by a driver of the vehicle, an arrangement for maintaining constant the speed of said vehicle by holding said gas pedal in a selected higher speed position, comprising a lockable device mounted on said vehicle independently of said gas pedal, said lockable device including tensioning means, a flexible pulling element connecting in tension between said tensioning means and said gas pedal, the spring-bias of said gas pedal being greater than the force of said tensioning means, said lockable device including releaseable locking means for locking said tensioning means to fix the position of said flexible pulling element, and means including a flexible pulling element interconnecting said releaseable locking means and said gas pedal to lock said locking means by the application thereto of a biasing force of said gas pedal; said lockable device and said flexible pulling elements being so constructed and arranged that only on application of said biasing force to said locking means, by release of the brake pedal by the driver, said gas pedal may be locked in a higher speed position by said lockable device, said higher speed position being selected by adjustment of the gas pedal against its spring-bias prior to release of the brake pedal, said locking means being releaseable to release said tensioning device and therewith said gas pedal from said higher speed position to said low speed position only upon further actuation of the brake pedal.

References Cited in the file of this patent

UNITED STATES PATENTS

| | | |
|---|---|---|
| 2,034,253 | Shelley | Mar. 17, 1936 |
| 2,143,318 | Isbell | Jan. 10, 1939 |
| 2,670,822 | Reilly | Mar. 2, 1954 |
| 2,765,671 | Francis | Oct. 9, 1956 |
| 2,765,672 | Dixon | Oct. 9, 1956 |